May 4, 1971   C. DAVID   3,577,294

METHOD FOR MAKING 3-D FILAMENT REINFORCED ARTICLES

Filed March 17, 1969   2 Sheets-Sheet 1

INVENTOR.
CONSTANT V. DAVID

BY Carl R. Brown

ATTORNEY

INVENTOR.
CONSTANT V. DAVID
BY Carl R. Brown
ATTORNEY

United States Patent Office 3,577,294
Patented May 4, 1971

3,577,294
METHOD FOR MAKING 3-D FILAMENT REINFORCED ARTICLES
Constant David, 2625 Loring St.,
San Diego, Calif. 92109
Filed Mar. 17, 1969, Ser. No. 815,515
Int. Cl. B65h 54/06
U.S. Cl. 156—173          10 Claims

ABSTRACT OF THE DISCLOSURE

Method and apparatus for making 3-D filament reinforced shells by securing short reinforcing fibers onto a form which fibers project in a substantially normal direction from the surface of the form, and winding in helical arrangement strands coated with plastic resin onto the form either as individual strands or as tapes formed by a plurality of strands, which strands are substantially normal to the fibers.

BACKGROUND OF THE INVENTION

There are many applications for shells of revolution that can be subjected to mechanical loads from all directions, either locally or over the entire shell surface, both internal as well as external. These mechanical loads create stresses in three principal directions, that is longitudinally, circumferentially, and radially. Several techniques have been developed to build structures that can efficiently withstand such stresses. The most pertinent and basic technique is referred to as the "3-D weave." In this process, reinforcing filaments are arranged within a resin matrix at angles to each other. The resin matrix holds the filaments together and transfers the shear and other types of loads from filament to filament. The woven mat, with filaments laid or interwoven in three substantially normal directions, are impregnated with appropriate resin, cured and machined to desired dimensions. Several alternate processes have been developed and are used to obtain such a "3-D weave" reinforced shell, but all of these processes are complex and are therefore expensive. In most cases, the resin impregnation must be performed after the "weaving" operation, which adversely affects the overall quality of the finished products. Also in many instances, the minimum size of each group of filaments must be made larger than would otherwise be desirable.

Most or all of the disadvantages of the prior art concepts stem from the limitations or constraints imposed by the fabrication process involved. Not only must the size of the filaments or groups of fibers forming one strand be larger than is desirable for good load distribution within the filaments or between the fibers in one filament, but the filaments cannot be pre-impregnated with the binding matrix resin before filaments assembling. Post weaving resin impregnation, especially for thick shells, cannot yield as good and uniform resin distribution and compactness as is achievable with pre-impregnation techniques. Also in such processes, the weaving or assembling of the filaments into a shell shape is usually a lengthy process that either requires complex mechinery or many sequenced fabrication steps. This causes a more expensive and lesser quality product than is obtainable with more simple and more easily controlled fabrication processes. Still further, such processes do not allow for pre-stressing of some of the filaments and since most resins shrink during their curing process, some of the filaments are distorted and therefore less capable of carrying loads efficiently. Lastly, the known processes do not provide for incorporation of doping dust or powder in the resin and between the filaments, which limits the use of the final reinforced sheel. Therefore it is advantageous to have a new, improved and simplified process for making improved 3-D filament reinforced shells.

SUMMARY OF THE INVENTION

In an exemplary embodiment of the method and apparatus of this invention, short reinforcing fibers are secured to a form or mandrel rigidly prior to the winding of the filaments onto the form or mandrel. This is accomplished by one of two processes. In one process a layer of soft material is applied to the outer surface of the form. The short reinforcing fibers are then projected into the soft material radially to the circular mandrel or at angles normal to the surface of the form. The soft material is then hardened and the filaments are wound onto the mandrel and around the fibers. The fibers are of short length and are so rigidly held that the strands do not bend the fibers but rather pass over their pointed ends and lay alongside or against the fibers. The filaments are wound in a web with layers at angles to each other forming the matrix in coordination with the reinforcing fibers. In another mode, the short reinforcing fibers are secured in a material that is then wrapped and bonded to the mandrel. The fibers are thus rigidly held in the radial direction and the filaments are then wound onto the mandrel and around and against the stiff fibers. To facilitate removing the mandrel or form from the end structure, the mandrel in one embodiment of the invention is formed by a wire armature or form to which is molded heated liquid salt that is then dried to a hard shell onto the armature. After the bristles and filaments are placed on the mandrel, then hot water is used to dissolve the salt, allowing the wire armature to be collapsed and removed.

With the mandrel brush fabrication, the filaments can be wound in helical windings on the mandrel by more conventional and simpler machines. Further the filaments, which may be individual filaments or tapes comprising multiple filaments that are pierced by the stiff bristles of the mandrel brush, may be pre-impregnated and heated prior to wrapping or may be impregnated immediately prior to wrapping. Also doping powder particles may be selectively applied by a shaker device to the sticky resin coated filaments and thus be selectively controlled under state of the art techniques and the filaments may be selectively tensioned as desired to substantially eliminate waves in the filaments in the finished structure. The process of this invention provides a simplified approach for fabricating an improved 3-D filament reinforced shell structure.

It is therefore an object of this invention to provide a new and improved method and apparatus for fabricating 3-D filament reinforced shells.

It is another object of this invention to provide a new and improved 3-D method and apparatus for fabricating filament reinforced shell that in part uses existing fabrication techniques of filament winding and pre-impregnation.

It is another object of this invention to provide a new and improved method and apparatus for making 3-D filament reinforced shells in which reinforcements can be wound in tap form.

It is another object of this invention to provide a new and improved method and apparatus for making 3-D filament reinforced shells in which the winding angle is controllable thus allowing adjustment of the ratio between longitudinal and circumferential strength.

It is another object of this invention to provide a new and improved method and apparatus for making 3-D filament reinforced shells in which the filaments are exactly positioned and wound with predetermined tension stresses and the filaments cross section can be small, yielding a better composite homogeneity.

It is another object of this invention to provide a new and improved method and apparatus for making 3-D filament reinforced shells that employ a winding process that allows easy doping of the winding resin with dust, powder, or small particles if and when required so that secondary functions can be performed by the fabricated shell.

Other objects and many advantages of this invention will become more apparent upon a reading of the following detailed description and an examination of the drawings wherein like reference numerals designate like parts throughout and in which:

FIG. 4 is a schematic illustration of structure for doping the binding resin with dust, powder or the like.

Figure 1:
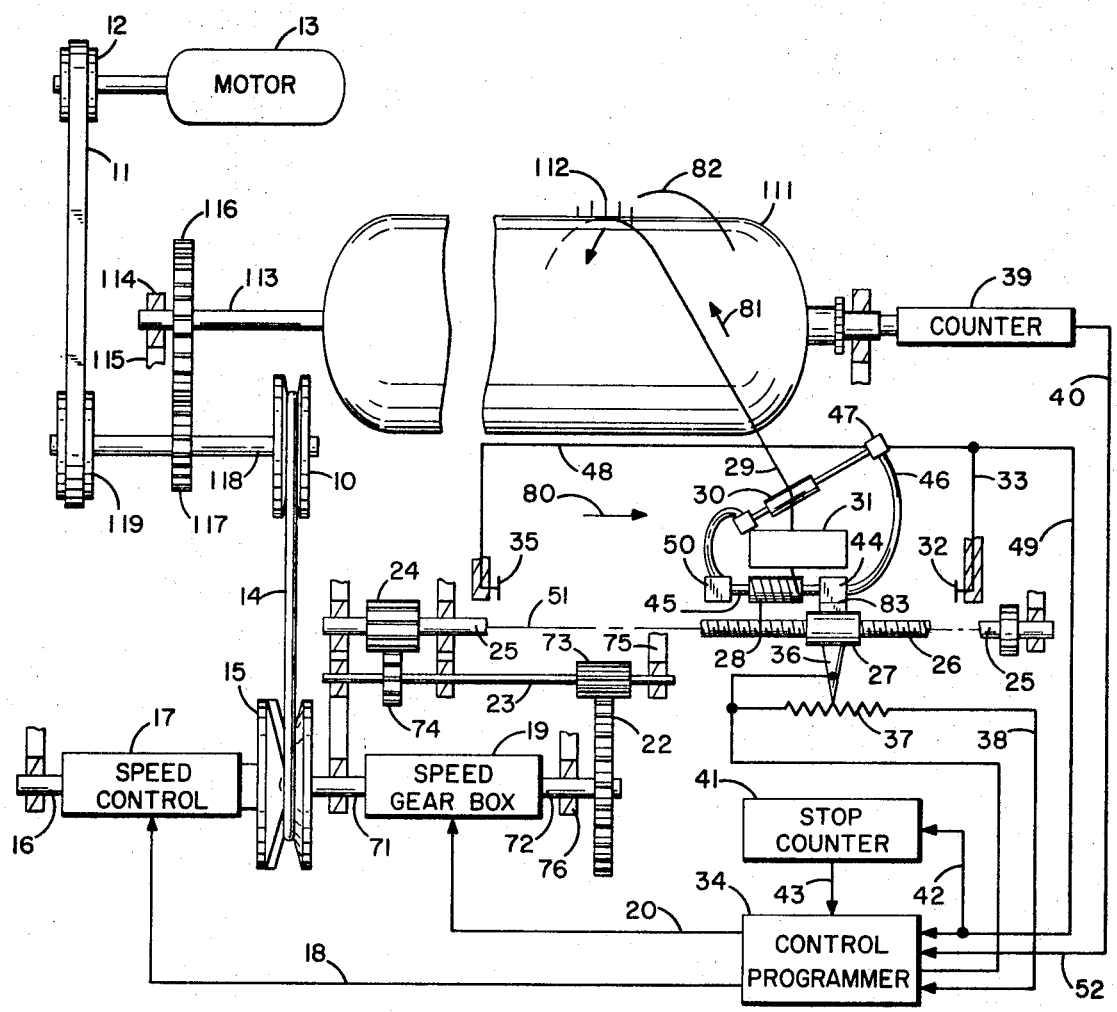
FIG. 1 is a plan view, partly schematic and partly in cross section with parts broken away, of an embodiment of the method and apparatus of this invention.
Figure 8:
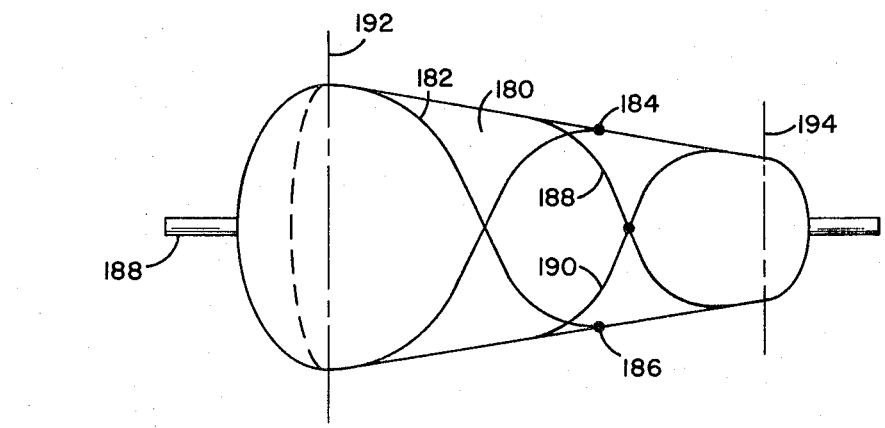
FIG. 8 is a schematic view of the angle of filament windings on a cylindrical shaped mandrel.

Referring now to FIG. 1, a mandrel 111 is supported on shaft 113 for rotational movement thereon. The mandrel 111 has a cylindrical shape with curved end bulkheads. However, it may be understood that the mandrel 111 may have different shapes consistent with the operation of this invention, such as illustrated in FIG. 8. The mandrel has short reinforcing fibers 112 projecting from the surface thereof. While the fibers 112 are only illustrated representatively on the mandrel 111, it may be understood that these fibers cover the substantial portion of the entire outer surface of the mandrel 111. The shaft 113 is supported by bearings 114 that are held by the machine structure 115 (not shown in detail). The shaft 113 is driven by gear 116 so that the mandrel rotates in the direction of arrow 82. The gear drive 116 in turn is driven by gear 117 that is mounted on shaft 118, which also supports a pulley 119 and a V belt pulley 10. Pulley 119 is driven by belt 11 that is driven by pulley 12 and drive motor 13. The V belt pulley 10 drives V belt 14 that drives adjustable V belt pulley 15. V belt pulley 15 can vary its nominal radius so that the angular velocity of the shaft 71 on which it is mounted can vary for a constant angular velocity of shafts 118 and 113. Speed control unit 17 in response to electrical signals through line 18, as will be described in more detail hereinafter, adjusts the structure of V belt pulley 15 to selectively set its nominal radius and thus control the rotational speed rate of shaft 71. The slack of V belt 14 is taken up by a constant tension pulley (not shown).

Figure 2:
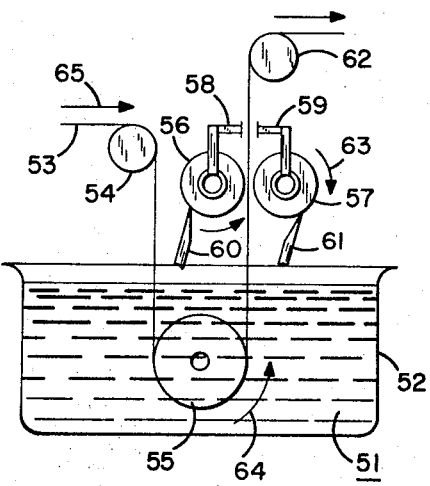
FIG. 2 is a schematic illustration of the structure for impregnating filaments in the process.
Figure 3:
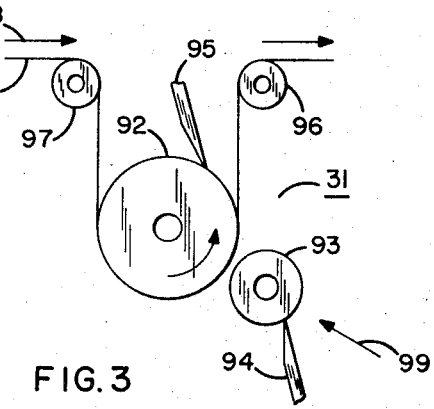
FIG. 3 is a schematic illustration of the structure for heating and tensioning pre-impregnated filaments.

The shaft 71 driven by V belt pulley 15 enters a clutch-forward-backward, combination speed gear box 19 that can transmit the rotation of shaft 71 to rotation of shaft 72, supported by bearing 76, in either direction according to the signal received through line 20 or declutch and disengage shaft 72. A gear 22 mounted on shaft 72 drives through a gear chain comprising gear 73, shaft 23, and drive gear 74 that are supported by bearings 75. Gear 24 and shaft 25 drives a power screw mechanism 26 that moves a threaded power nut 27 in right or left directions depending upon the direction of the rotation of shaft 25. The power unit supports a spool 28 on which filament or tape 29 is stored. The spool 28 is supported by shaft 45 in bearing members 44 and 50. Arms 46 are also carried by member 44 and bearing members 47 carry roller 30. The member 44 is in turn supported on a bearing connection 83 on the power nut 27. Thus the entire spool structure may be rotated on the power nut support 27. The filament or tape is guided by roller 30 that helps position the filaments properly. A resin impregnation system 31, see FIGS. 2 and 3, is positioned between the spool 28 and the roller 30. Tension is applied to the filament or tape either by brake action on spool 28 or within the resin impregnating system of FIGS. 2 and 3.

As the filament spool support moves on power nut 27 in the direction of arrow 80, the filament or tape 29 aligns itself on mandrel 111. When member 44 contacts a stop switch 32, shown schematically, a signal is sent through line 33 and line 49 to the control programmer 34 that in turn programs the action of the clutch speed reverser in the speed gear box 19. By known control techniques, the motion of the filament spool support is reversed and the winding proceeds in the other direction. The reverse movement is caused by reversing the rotational direction of shaft 72 and drive gear 22 that in turn reverses the drive chain comprising gear 73, shaft 23, gear 74, and gear 24. This reverses the rotation of the threaded portion 26. Thus the filament spool support contact moves in the reverse direction of arrow 80 until member 50 contacts control switch 35. This sends a signal through lines 48 and 49 to the control programmer 34 that through line 20 signals the speed gear box 19 to reverse the rotational direction of shaft 72 to the original direction of rotation. As the motion of filament spool support goes back and forth, the position of the filament spool support is constantly and continuously indicated by a location sensor 36 that is a wiping contact on a rheostat 37. This changes the resistance in line 38 that is sensed by the control programmer 34. Thus the location of the filament spool support is sent in the form of an electrical signal to the control system 34 so that it can automatically monitor the linear velocity of the filament spool support and establish a given speed control signal through line 18 to the speed control unit 17 in the manner known in the art.

Thus in winding the filament onto the mandrel 111, the filament spool support is moved back and forth longitudinally along the mandrel 111 that is in turn rotated on shaft 113. The filament 29 is pulled off the spool continuously in the direction of arrow 81 but at angles to the circumference of the mandrel 111. For mandrels having a short length and a very large diameter, it may be understood that this type of winding machine would not normally be used. In such situations, the filament spool support would remain fixed and the mandrel would be mounted on a shaft that can pivot in such a way that the winding or wrapping is accomplished through a wobbling motion of the mandrel. Such winding machines are well known in the state of the art and need not be elaborated on.

In the machine illustrated in FIG. 1, the winding angle or helix angle is determined directly by three parameters, namely the mandrel diameter, the angular velocity of the mandrel shaft 113, and the linear velocity of the filament spool support on power screw 26. Thus for a given mandrel diameter and assuming a constant angular velocity of shaft 113, the winding angle is defined by the angular velocity of shaft 25 driving the power screw 26, which controls the linear motion of the filament support. The combination of speed control unit 17 and programming monitor 34 provides the flexibility required to set and or adjust the winding angle either as a function of linear displacement of the filament spool support or as to the amount of winding performed or a combination of both. The progress of the winding operation and thus shell thickness is registered by a revolution counter 39 connected to shaft 113. The appropriate counting signal, that may be digital signal or an analog signal through use of known techniques, is sent through line 40 to the control programmer 34. Such counting can also be carried out with a stop counter 41 that counts the number of back and forth cycles performed by the filament spool-support through a line pickup 42, stop counter 44, and line 43. The programming and controlling systems are not described in further detail because such systems are used for monitoring machine tool operations and are well known in the state of the art.

In the operation of this invention, the filaments or tapes are impregnated prior to being wound onto the brush mandrel 111. This is a particular advantage of the invention as it allows the resin to be applied directly to the structure as it is built up and also allows better control of the resin in the end structure. The resin impregnation may be either applied to the filament 29 during the winding operation or the filaments may be pre-impregnated. Where the resin impregation is carried out during the winding operation, then the filament or tape 29 is passed through process 31 in which the filament 29 is impregnated prior to being wrapped onto the mandrel 111. Referring to FIG. 2, the filament or tape 53 comes from filament spool 28 and moves in the direction of arrow 65 and is guided by roller 54. The filament 53 or 29 penetrates the resin in tank 52 and loops around the larger roller 55. When the filament or tape between two rollers 56 and 57 that are pressed one against the other by a known spring loaded mechanism generally illustrated by arms 58 and 59. The amount of spring tension exerted by arms 58 and 59 determines the pressure applied by the rollers 56 and 57 to the filament and therefore determines the degree of resin impregnation desired. The excess resin flows back down into the resin tank 52. The rollers 56 and 57 that rotate in the direction of arrows 63, are constantly cleaned by doctor blades 60 and 61 that press against these rollers and removes any excess resin sticking thereto. The filament or tape, now resin impregnated, is directed by guide roller 12 and the filament is wound onto the mandrel 111.

FIG. 3 illustrates the handling of the filament when the filament is pre-impregnated with B-state cured resin or the like. The filament or tape 91, which corresponds to filament or tape 29, moves in the direction of arrow 98 from the spool 28 and is already impregnated with resin. The resin is not liquid but solid and is not completely cured. It can still melt when subjected to heat and then cured completely if the heat is continuously applied. Such pre-impregnated filament or tape might be too stiff and unyielding to wind itself effectively onto the mandrel brush. Accordingly the resin must be softened first and this is achieved by passing the filament or tape around a drum 92 that is heated to the desired temperature by a heating coil or the like (not shown). A roller 97 directs the tape around heated roller 92 and between rollers 92 and pressure roller 93 that may be moved in the direction of arrow 99 to exert pressure onto the heated filament 91. Roller 93 through control of compressive pressure squeezes out excess resin from the tape or filament 91. The filament leaves the drum with the resin being soft or liquid and is guided toward the mandrel by roller 96 in the direction of the arrow. Doctor blades 94 and 95 remove the excess resin from the surface of drums 92 and 93. In both cases, the filament contains the amount of resin required and desired to constitute the shell structure.

Figure 4:
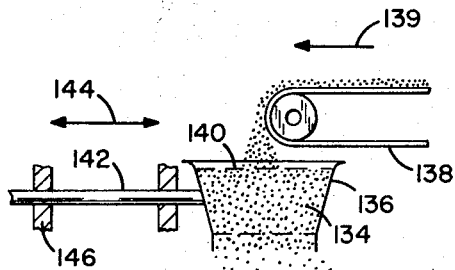
Figure 6:
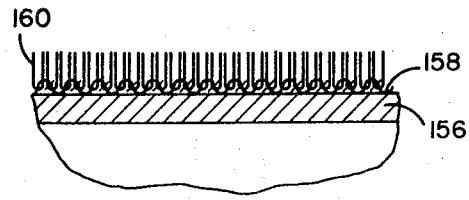
FIG. 6 is a cross-sectional view of a modified mandrel brush structure.

In the case of employing a tape instead of filament 29, which tape would normally comprise a plurality of filaments that move together in the form of a tape, it may be desirable to add a solid powdered material to the composite final structure. Often the doping of the binding resin with dust, powder, or small particles permits the shell to perform secondary functions, besides adding structural strength to the shell. Such secondary functions include the provision for higher or lower radiation transmission, higher or lower thermal transmission, higher capacity, weight lightening, shock attenuation enhancement, decreasing local micro-stress concentration and other uses. The tape, see FIG. 4, to be wound and which is impregnated with uncured, sticky resin, which for example is applied through the previously described processes of FIG. 2 and FIG. 3, is passed under a shaker structure 136 that is actuated by a rod 142 that rests in bearings 146 and is actuated by a suitable vibrating mechanism, not shown, in the direction of arrows 144. The dust or powder 134 is carried by conveyor belt 138 in the direction of arrow 139 and is deposited on the screen 140 and then passes through the shaker 136 onto the filament or tape 130. The shaking action deposits the powder at a desired rate onto the width of the tape. The shaker assembly is attached to the tape resin impregnating system 31 in FIG. 6 and moves with the tape spool support assembly. The doped tape is then directly wound onto the mandrel 111.

Figure 5:
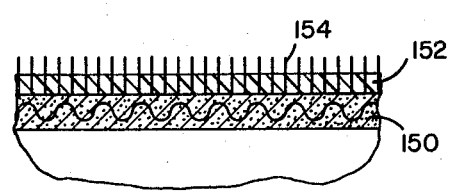
FIG. 5 is a cross sectional view of a section of the mandrel brush used in this invention.

As previously described, the mandrel 111 has a plurality of short reinforcing fibers 112 secured to the surface thereof that project radially from the mandrel 111. These fibers 112, which may be made of beryllium, boron or other suitable materials, and are stiff, rigid, and strong, can be secured to the mandrel in any suitable manner but preferably are secured to the mandrel in a new and novel manner as herein described. In one process, see FIG. 5, the surface of the mandrel 150 is covered with a layer of soft material such as wax, soft uncured resin, or carbon foam that is bonded to the mandrel structure. The bristles used to make the brush are driven into the soft layer by any of several methods, such as shooting bristles of the correct length from an air gun at correct and programmed intervals, or driving the bristles with a vibrating hammer. Since these bristles are very stiff and can be easily driven into the soft layer until they reach the hard mandrel structure, their penetration is stopped at the mandrel structure and the length of the bristles is determined by the thickness of the composite structure desired. Upon completion of the brush and before the filament winding operation is started, the soft layer is hardened, either by completing the curing of the resin or impregnating the carbon foam that is subsequently cured. The bristles are then firmly embedded in the mandrel and the winding operation can be performed.

Alternatively, a velvet like assembly is fabricated separately. The bristles 160 of the brush to be held are positioned in the cloth layer 158, as is well known in the state of the art in velvet manufacturing. The length of the bristles sticking out of the "velvet" material corresponds to the composite shell thickness desired. This velvet material is wrapped and bonded to the mandrel hard structure by any well known means and the mandrel and bristles are then ready for filament or tape winding.

Upon completion of the winding operation and curing of the shell composite resin, the mandrel is then extracted from the shell. According to the type of material used for the mandrel, different techniques can be used. A preferred method is that the mandrel structure, see FIG. 5, consists of a wire armature around which a high temperature melted salt has been molded. This salt is hard at room temperature at which the winding operation is performed. The salt is strong and rigid and is reinforced with the wire armature. Upon completion of the curing step, the salt is easily dissolved with water and is flushed with the water from the structure. The wire armature is then removed. The layer such as the fabric layer 158 can then be machined off the final shell assembly and the outer shell surface can also be machined if so desired.

Figure 7:
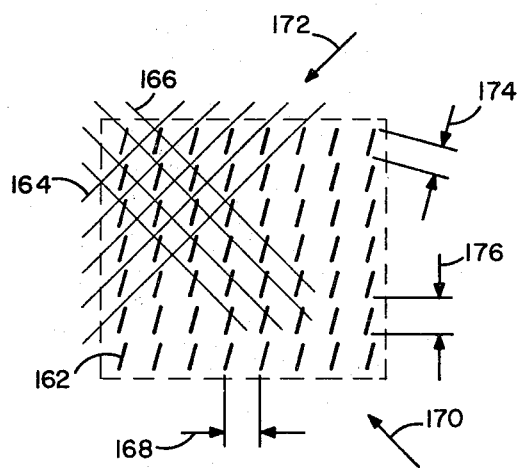
FIG. 7 is a schematic illustration of the filament winding angles relative to the short reinforced fibers.

In the method and apparatus for forming 3-D filament reinforced shell structures, the short reinforcing fibers have sufficient strength that in the winding process, the filaments or tapes are wound directly over the reinforcing fibers, as for example fibers 162 of the diagram of FIG. 7. The fibers do not bend and where the filament comprises a tape, the fibers pierce and pass between the strands in the tape. Thus the filaments or tapes are wound directly onto the mandrel and the fibers 112 and 162 maintain their rigidity throughout the winding process. In order to achieve the 3-D filament reinforced structure, the filaments, as for example filaments 164 and 166, are wound at a substantially 90 degree angle. The relative spacing, as for example spacing 168 and 176, establish the location of the reinforcing fibers and thus the ultimate strength of the composite structure. The height 174 of each fiber is determined by the thickness of the composite structure desired. The angular directions 170 and 172 of the windings 164 and 166 is determined by the relative speed parameters of the moving parts of the structure in FIG. 1 as was previously described.

Referring to FIG. 8 a winding, for example winding 182, may be wound from starting point 186 over the end of the mandrel 180 and back in the return angular direction 184. Alternatively the filaments may be wound as filament 188 in one direction and then wound in an opposite direction of filament 190. The ends of the mandrel 180 are often curved to provide continuous winding back and forth of the filaments. After the winding operation and after the structure has been cured, the ends of the mandrel 180 may be cut off along dotted lines 192 and 194 facilitating removal of the mandrel that is supported on shaft 188.

Having described my invention, I now claim:

1. The method of forming a reinforced plastic structure comprising the steps of
   projecting short, stiff, reinforcing fibers radially from a form,
   winding strands coated with plastic resin in layers in a controlled manner on the form and along the sides of the fibers,
   and curing said resin in the wound structure to form a structure of layers of resin coated strands with reinforcing fibers embedded therein forming a three dimensional composite structure.

2. The method as claimed in claim 1 in which said strands are wound at helical angles.

3. The method as claimed in claim 2 in which said strands comprise a tape of strands that are wound over said form and over said reinforcing fibers with said fibers projecting through said tape.

4. The method as claimed in claim 2 including the step of passing said strands through a liquid resin prior to winding said strands on said form.

5. The method as claimed in claim 2 in which the strands wound on said form are pre-impregnated with resin,
and heating said pre-impregnated strands immediately prior to winding the strands on the form.

6. The method as claimed in claim 2 including the step of prior to winding the strands on the form, laying a layer of material onto the form and inserting said reinforcing fibers into said material in a direction substantially normal to the surface of the form.

7. The method as claimed in claim 2 including the step of
   securing bristles to a woven material,
   and wrapping and bonding the material onto the form with the reinforcing members projecting in a direction substantially normal to the surface of the form.

8. The method as claimed in claim 2 including the step of
   forming the form by forming a wire armature in the shape of the form and molding melted salt onto the wire armature,
   and allowing the salt to harden.

9. The method as claimed in claim 8 including the steps of
   removing the mold by applying hot water to dissolve the salt in the form,
   and collapsing the wire armature.

10. The method as claimed in claim 4 including the step of applying doping particles to the strands prior to winding the strands on the form.

References Cited

UNITED STATES PATENTS

| | | | |
|---|---|---|---|
| 2,152,612 | 3/1939 | Tischer | 156—171X |
| 2,789,075 | 4/1957 | Stahl | 156—191X |
| 3,321,347 | 5/1967 | Price et al. | 156—172X |
| 3,418,186 | 12/1968 | Wetzel | 156—172X |

LELAND A. SEBASTIAN, Primary Examiner

E. E. LEHMANN, Assistant Examiner

U.S. Cl. X.R.

156—184, 191